Sept. 5, 1944. C. A. MILLER 2,357,340
REFRIGERATION
Filed Oct. 4, 1941
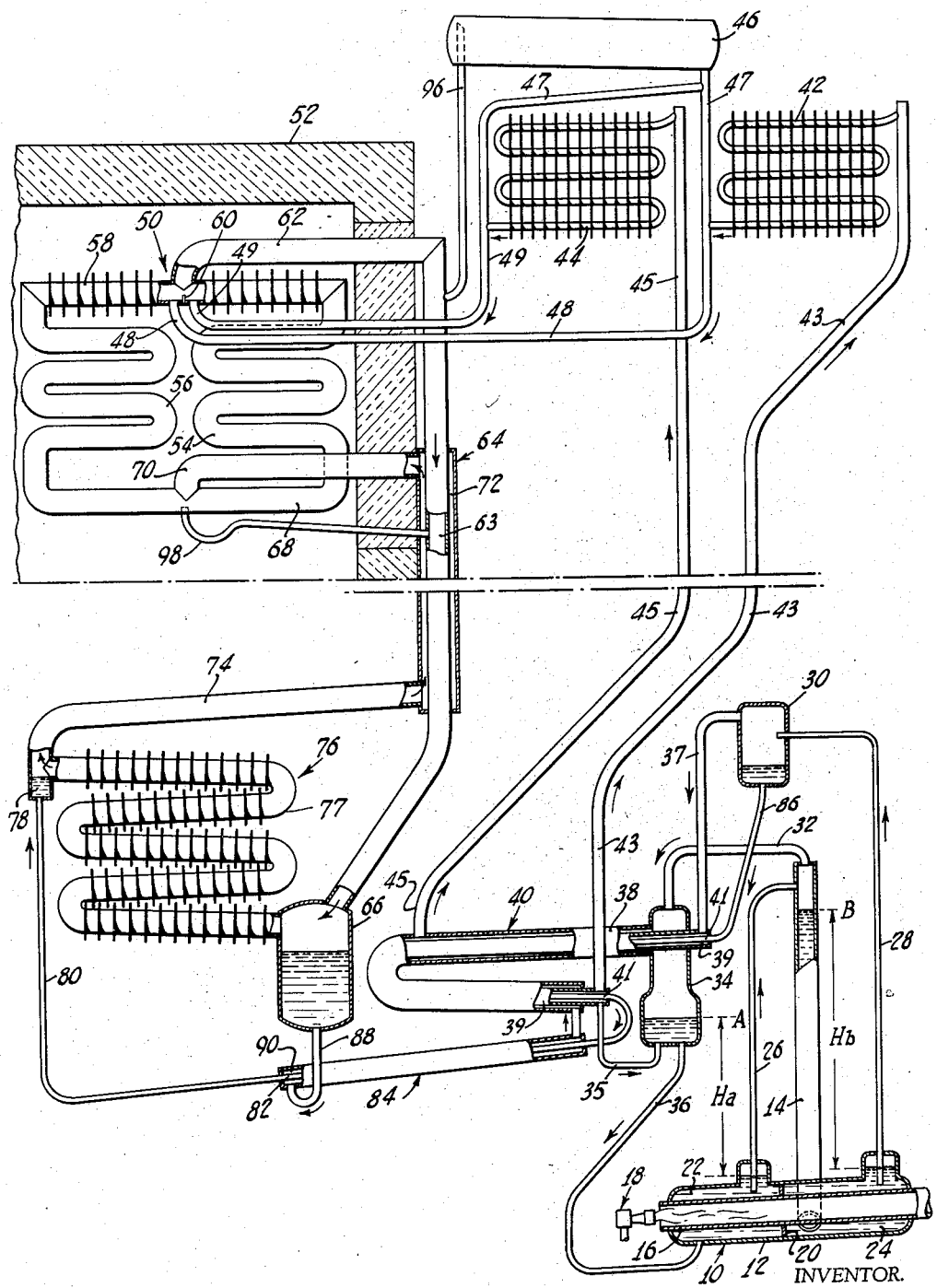
INVENTOR.
CHARLES A. MILLER.
BY Blair, Curtis & Hayward
ATTORNEYS Patented Sept. 5, 1944

2,357,340

UNITED STATES PATENT OFFICE 2,357,340

REFRIGERATION

Charles A. Miller, Evansville, Ind., assignor to Servel, Inc., New York, N. Y., a corporation of Delaware Application October 4, 1941, Serial No. 413,584

7 Claims. (Cl. 62—119.5)

This invention relates to refrigeration and more particularly to an absorption type refrigerator wherein the refrigerant is evaporated in the presence of an auxiliary pressure equalizing fluid.

An object of this invention is to provide for the more efficient operation of a refrigeration system. A further object is to provide a refrigerator which will be efficient and dependable in operation and wherein the refrigerant is delivered in liquid form to a plurality of evaporators. A further object is to provide for the controlled division of a stream of the refrigerant. A further object is to provide a refrigeration system for independently refrigerating two compartments or sections of a refrigerator. These and other objects will be in part obvious and in part pointed out below.

The drawing comprises a single figure showing more or less diagrammatically a refrigeration system embodying the invention. This is a closed system containing a refrigerant fluid, such as ammonia, a liquid absorbent for the refrigerant, such as water, and an auxiliary pressure equalizing fluid, such as hydrogen. During operation ammonia is driven from the aqua-ammonia solution in the generator, and the ammonia is then condensed. The condensed refrigerant is delivered to an evaporator where it evaporates in the presence of the hydrogen. The mixture of hydrogen and ammonia gases flows to an absorber where the ammonia is absorbed by the "weak liquor," which is a weak solution of ammonia and water received from the generator, and the hydrogen deprived of ammonia refrigerant returns to the evaporator. The liquor enriched with the ammonia returns to the generator, thus completing the cycle.

In the illustrative embodiment, the refrigeration system includes at the lower right-hand corner of the figure a generator indicated at 10 which is supplied with the strong aqua-ammonia solution, referred to as "rich liquor." The fluids of the generator assembly are received from and delivered to the other portions of the system through a triple heat exchanger 40 at the left of which is shown an absorber 76 formed by a finned coil pipe 77 and an absorber sump vessel 66. Above the absorber is shown an evaporator assembly 50 having a right-hand section 54 and a left-hand section 56 positioned within a heat-insulated refrigerated compartment 52. At the right of the evaporator assembly are shown two finned condensers 42 and 44 and a gas pressure vessel 46.

Generator 10 comprises a horizontally extending main portion 12 and a standpipe 14. Extending through the main portion 12 is a flue 16 at the left-hand end of which is positioned a gas burner 18 directing its flame into the end of the flue. Under some circumstances it may be desirable to use other heating means such as an electric heating means such as an electric heating element or a liquid fuel burner. Near the center of the main portion 12 is a fluid-tight partition 20 which forms a left-hand fluid chamber 22 and a right-hand fluid chamber 24. The lower end of standpipe 14 opens into chamber 24. Connected to and extending upwardly from chamber 22 is a vapor lift conduit 26, the upper end of which opens into the upper end of standpipe 14. A similar vapor lift conduit 28 connects the chamber 24 to a separator vessel 30. The top of standpipe 14 is connected through a conduit 32 to an intermediate vessel 34. Extending downwardly from the bottom of vessel 34 is a conduit 36 which is connected to the bottom of chamber 22 of the generator and which delivers the rich liquor to the generator.

Connected into the top of vessel 34 is the annular outer conduit 38 of the triple heat exchanger 40 referred to above and connecting the generator assembly with the other units of the refrigeration system. Triple heat exchanger 40 has an annular middle passage 39 and an inner passage 41. The upper end of middle passage 39 is connected through a conduit 37 to the top of vessel 30 to receive vapor from the vessel. The lower end of passage 39 is connected through a liquid drain conduit 35 to the bottom of intermediate vessel 34, and it is also connected through an upwardly extending vapor conduit 43 to the upper end of condenser 42. Outer passage 38 is connected through a similar vapor conduit 45 to the top of condenser 44.

The left-hand ends of condensers 42 and 44 are connected to a gas pressure vessel 46 through a pair of conduits 47. The outlets of condensers 42 and 44 are connected, respectively, through conduits 48 and 49 to the sections 56 and 54 of the evaporator assembly 50. The tops of sections 56 and 54 are formed by a horizontally extending finned pipe 58 which has at its center a semicircular dam 60 normally preventing the flow of liquid refrigerant from one section to the other. Pipe 49 opens at the right-hand side of dam 60 so as to deliver refrigerant to the right-hand section 54, while pipe 48 is connected on the left-hand side of this dam so as to deliver liquid refrigerant to the left-hand section 56. Connected to pipe 58 directly above dam 60 is a gas return conduit 62 which extends through the compartment wall and thence downwardly, forming the inner passage 63 of a heat exchanger 64, and then to the absorber sump vessel 66.

The bottom ends of evaporator sections 54 and 56 are connected to form an unobstructed horizontal pipe 68, the center of which is connected to a gas supply conduit 70. Conduit 70 extends to the right and is connected through the outer passage 72 of heat exchanger 64, and thence through conduit 74 to the upper end of absorber 76. At the top of the absorber is a liquid supply sump 78 into which empties a liquid supply conduit 80 supplying weak liquor to the absorber. Conduit 80 extends downwardly and to the right through the inner passage 82 of liquid heat exchanger 84 and thence through the inner passage 41 of the triple heat exchanger 40 to conduit 86, which is connected to the bottom of vessel 30. The bottom of absorber sump vessel 66 is connected through a conduit 88, the outer passage 90 of heat exchanger 84, and the outer passage 38 of heat exchanger 40 to the upper portion of vessel 34. Gas pressure vessel 46 is connected through a conduit 96 to the gas return conduit 62.

As indicated above, the ammonia vapor is expelled from solution by heating generator 10. The rich liquor is supplied to the generator through conduit 36 from intermediate vessel 34 having a liquid level indicated at A. This maintains a constant head $H_a$ on the liquid in chamber 22, and the liquid tends to flow upwardly into the lower end of vapor lift conduit 26. Vapor entering the bottom of the vapor lift conduit lifts the trapped liquid and dumps it into the top of standpipe 14 where the liquid has a level indicated at B. The liquid in standpipe 14 maintains a liquid head $H_b$ on the liquid in chamber 24, with the result that liquid flows upwardly in vapor lift tube 28, and it is trapped and carried by vapor upwardly to vessel 30. The refrigerant vapor separates from the liquid leaving weak liquor.

This weak liquor flows through conduit 86, inner passage 41, inner passage 82, and conduit 80 to sump 78, and the liquid level in vessel 30 is such as to cause an overflow of the weak liquor from the sump into the top of absorber coil pipe 77. In flowing downwardly through the absorber, this liquid absorbs ammonia from the mixture of ammonia and hydrogen, and the rich liquor collects in sump vessel 66 to the level shown. The bottom of the sump vessel is connected through conduit 88, outer passage 90 of heat exchanger 84, and outer passage 38 of heat exchanger 40 to the top of vessel 34, and the liquid level in vessel 66 is such as to cause the liquid to flow from sump vessel 66 into vessel 34. The ammonia vapor from standpipe 14 flows through conduit 32 into the top of vessel 34, and thence to the left through outer passage 38 of heat exchanger 40 to conduit 45. The flow of this ammonia vapor to the left through outer passage 38 is in counterflow relationship to the rich liquor flowing from sump vessel 66 into vessel 34 with the result that this portion of the pipe acts as an analyzer. Thus, the rich liquor is heated, and some evaporation of ammonia takes place. The substantially pure ammonia vapor reaching conduit 45 moves upwardly to condenser 44, where it is condensed and delivered to the right-hand evaporator section 54.

In vessel 30 the ammonia vapor leaves the weak liquor and flows downwardly through conduit 37 and thence into the middle passage 39 of the heat exchanger 40. In this passage the vapor is cooled due to its heat exchange relation with the rich liquor in the outer passage 38, and as a result the water vapor present is condensed. The condensate drains from the bottom of passage 39 through conduit 35 into vessel 34, and the rectified ammonia vapor passes upwardly through conduit 43 to condenser 42. In vessel 34 the liquid level is below the lower end of passage 39 so that the passage is cleared of condensate at all times. As indicated above, the vapor in condenser 42 is condensed and flows through conduit 48 to the left-hand evaporator section. The bottom of the evaporator assembly 50 is connected through a liquid trap pipe 98 to the central passage 63 of heat exchanger 64 to thereby return unevaporated liquid to the absorber.

The two evaporator sections operate independently to produce refrigeration, and each is supplied with refrigerant from a separate condenser to produce the cooling desired. The relative refrigeration effect in the two sections of the evaporator depends upon the rate at which refrigerant vapor is expelled from solution in each of the chambers 22 and 24 of the generator assembly. This in turn is primarily determined by the relative size of the two sections of the generator and the proportion of the heat input taken up by the solution in each of the generator chambers.

It is thus seen that I have provided an improved refrigeration system in accordance with the objects set forth. As many possible embodiments may be made of the mechanical features of the above invention, and as the art herein described might be varied in various parts, all without departing from the scope of the invention, it is to be understood that all matter hereinabove set forth, or shown in the accompanying drawing, is to be interpreted as illustrative and not in a limiting sense.

I claim:

1. In a refrigerator generator assembly of the character described, the combination of means constituting a place of heating and forming a first heating chamber and a second heating chamber, an intermediate vessel connected to said first heating chamber and through which lqiuid absorbent rich in refrigerant is delivered to said first heating chamber, a vapor lift connected to and extending from said first heating chamber and adapted to withdraw liquid from said first heating chamber, means constituting a separating chamber adapted to receive liquid and vapor from said vapor lift and in open liquid flow relationship with said second heating chamber, conduit means connecting the top of said separating chamber to the top of said intermediate vessel, a second vapor lift connected to and extending from said second heating chamber and adapted to withdraw liquid therefrom, a separating vessel adapted to receive the liquid and heated vapors from said second vapor lift, a rectifier connected to receive heated vapors from said separating vessel and connected at its lower end to drain condensate into said intermediate vessel, means constituting an analyzer through which refrigerant vapor is withdrawn from said intermediate vessel in counterflow relationship with liquid absorbent rich in refrigerant flowing into said intermediate vessel, and conduit means connecting said analyzer to a condenser means.

2. In a refrigeration system containing a refrigerant and a fluid absorbent and having a place of heating for causing expulsion of refrigerant from the fluid absorbent, a heat exchanger assembly having a first passage in which is adapted to pass a stream of the fluid absorbent containing refrigerant flowing toward the place of heating in counter-current to one stream of refrigerant vapor in fluid contact therewith, and having a second passage in which is adapted to pass another stream of refrigerant vapor in heat exchange relationship with said stream of fluid but out of physical contact therewith.

3. In a refrigerator generator assembly of the character described, the combination of means constituting a place of heating and forming a first heating chamber and a second heating chamber, an intermediate vessel connected to said first heating chamber and through which liquid absorbent rich in refrigerant is delivered to said first heating chamber, a vapor lift connected to and extending from said first heating chamber and adapted to withdraw liquid from said first heating chamber, means constituting a separating chamber adapted to receive liquid and vapor from said vapor lift and in open liquid flow relationship with said second heating chamber, conduit means connecting the top of said separating chamber to the top of said intermediate vessel, means forming a horizontally extending passageway from the upper portion of said intermediate vessel, conduit means connecting said passageway to a condenser, and means to deliver liquid absorbent rich in refrigerant through said passageway into said intermediate vessel so that the liquid absorbent flows in counterflow relationship with the refrigerant vapor.

4. In the art of refrigeration wherein a continuous stream of fluid absorbent is passed to a place of heating where the refrigerant is expelled therefrom, the steps of expelling a first stream of refrigerant vapor from the fluid absorbent, expelling a second stream of refrigerant vapor from the fluid absorbent, passing said first stream of refrigerant vapor in counterflow contact with the stream of fluid absorbent and thence to a first condenser, passing said second stream of refrigerant vapor in heat exchange relationship but out of contact with the stream of fluid absorbent and thence to a second condenser, and delivering the condensate from the two condensers to separate evaporator sections to thereby produce substantially independent refrigerating effects in the two evaporating sections.

5. A method of absorption refrigeration including, passing a relatively cold stream of liquid absorbent rich in refrigerant toward a place of heating through the outer passage of a triple heat exchanger toward a first heating chamber, heating the liquid absorbent to expel therefrom a first stream of refrigerant vapor, passing the liquid absorbent to a second heating chamber, heating the liquid absorbent in the second heating chamber to expel a second stream of refrigerant vapor, passing said first stream of refrigerant vapor in counterflow relationship in contact with said relatively cool stream of liquid absorbent to thereby cool the stream of refrigerant vapor and heat the stream of liquid absorbent, passing said first stream of refrigerant vapor to a condenser where it is condensed and thence to an evaporator section where it is evaporated to produce a refrigerating effect, passing said second stream of refrigerant vapor in heat exchange relationship but out of contact with said relatively cool stream of liquid absorbent to thereby heat the liquid absorbent and cool the refrigerant vapor, passing said second stream of refrigerant vapor to a second condenser where it is condensed and thence to an evaporator section where it is evaporated to produce a refrigeration effect, passing the liquid absorbent from said second heating chamber to an absorber, flowing the refrigerant from the evaporator sections to the absorber with the result that the liquid absorbent absorbs the refrigerant and is enriched, and returning the liquid absorbent thus enriched to the place of heating to thus complete the cycle.

6. In a refrigeration system containing a refrigerant and a fluid absorbent, a generator assembly to expel two separate streams of refrigerant vapor from the fluid absorbent, a plurality of condensers, means to pass one of said streams of refrigerant vapor to one of said condensers after counterflow contact with a stream of the fluid absorbent, means to pass the other of said streams of refrigerant vapor in heat-exchange relationship but out of contact with the stream of fluid absorbent and thence to another of said condensers, and an evaporator assembly having several evaporator portions to receive the separate streams of liquid refrigerant produced in said separate condensers.

7. A refrigeration system comprising an absorber and a generator unit providing a plurality of chambers, said absorber and said generator unit being interconnected to provide a circuit for circulation of absorption solution, means for heating one of said chambers to a higher temperature than another of said chambers, first and second condensers, conduit means having a portion thereof associated with a part of said circuit for conducting refrigerant vapor from said one chamber in intimate contact with and countercurrent to absorption solution flowing from said absorber to said generator unit and thence to said first condenser, conduit means for conducting refrigerant vapor from said other chamber to said second condenser, an evaporator structure, conduit means for conducting liquid formed in said first condenser to one part of said evaporator structure, and conduit means for conducting liquid formed in said second condenser to another part of said evaporator structure.

CHARLES A. MILLER.